United States Patent [19]
Loomis et al.

[11] Patent Number: 5,646,629
[45] Date of Patent: Jul. 8, 1997

[54] MEMORY CARTRIDGE FOR A HANDHELD ELECTRONIC VIDEO GAME

[75] Inventors: Peter Van Wyck Loomis, Sunnyvale; Dominic G. Farmer, Milpitas, both of Calif.

[73] Assignee: Trimble Navigation Limited, Sunnyvale, Calif.

[21] Appl. No.: 243,211

[22] Filed: May 16, 1994

[51] Int. Cl.$^6$ .............................. H04B 7/185; G01S 5/02
[52] U.S. Cl. .............................................................. 342/357
[58] Field of Search ....................................... 342/357, 389; 340/990, 995

[56] References Cited

U.S. PATENT DOCUMENTS

| | | | |
|---|---|---|---|
| 4,887,966 | 12/1989 | Gellerman | 434/45 |
| 4,958,837 | 9/1990 | Russell | 273/237 |
| 5,004,232 | 4/1991 | Wong et al. | 273/435 |
| 5,014,982 | 5/1991 | Okada et al. | 273/435 |
| 5,050,887 | 9/1991 | Kemp | 273/252 |
| 5,059,970 | 10/1991 | Raubenheimer et al. | 342/451 |
| 5,134,391 | 7/1992 | Okada | 340/799 |
| 5,173,710 | 12/1992 | Kelley et al. | 342/463 |
| 5,214,757 | 5/1993 | Mauney et al. | 342/463 |
| 5,239,669 | 8/1993 | Mason et al. | 455/12.1 |
| 5,248,150 | 9/1993 | Koma | 273/313 |
| 5,268,844 | 12/1993 | Carver et al. | 364/443 |
| 5,269,687 | 12/1993 | Matt et al. | 434/69 |
| 5,313,201 | 5/1994 | Ryan | 340/961 |
| 5,325,302 | 6/1994 | Izidon et al. | 364/461 |
| 5,381,338 | 1/1995 | Wysocki et al. | 364/449 |
| 5,507,485 | 4/1996 | Fisher | 273/32 R |

*Primary Examiner*—Theodore M. Blum
*Attorney, Agent, or Firm*—David R. Gildea

[57] ABSTRACT

An apparatus combining a handheld, electronic video game device, a location determination receiver, an electronic map and/or electronic yellow pages, and geocoding. The apparatus provides a user with his location and locations of map features and/or yellow page addresses proximate to his location. The handheld, electronic video game display displays the user's location and a map and/or yellow pages and hosts a memory cartridge that includes software for a user interface, for maps and/or yellow pages database, and for geocoding. The apparatus benefits from the high manufacturing and sales volumes of existing handheld games devices.

3 Claims, 4 Drawing Sheets

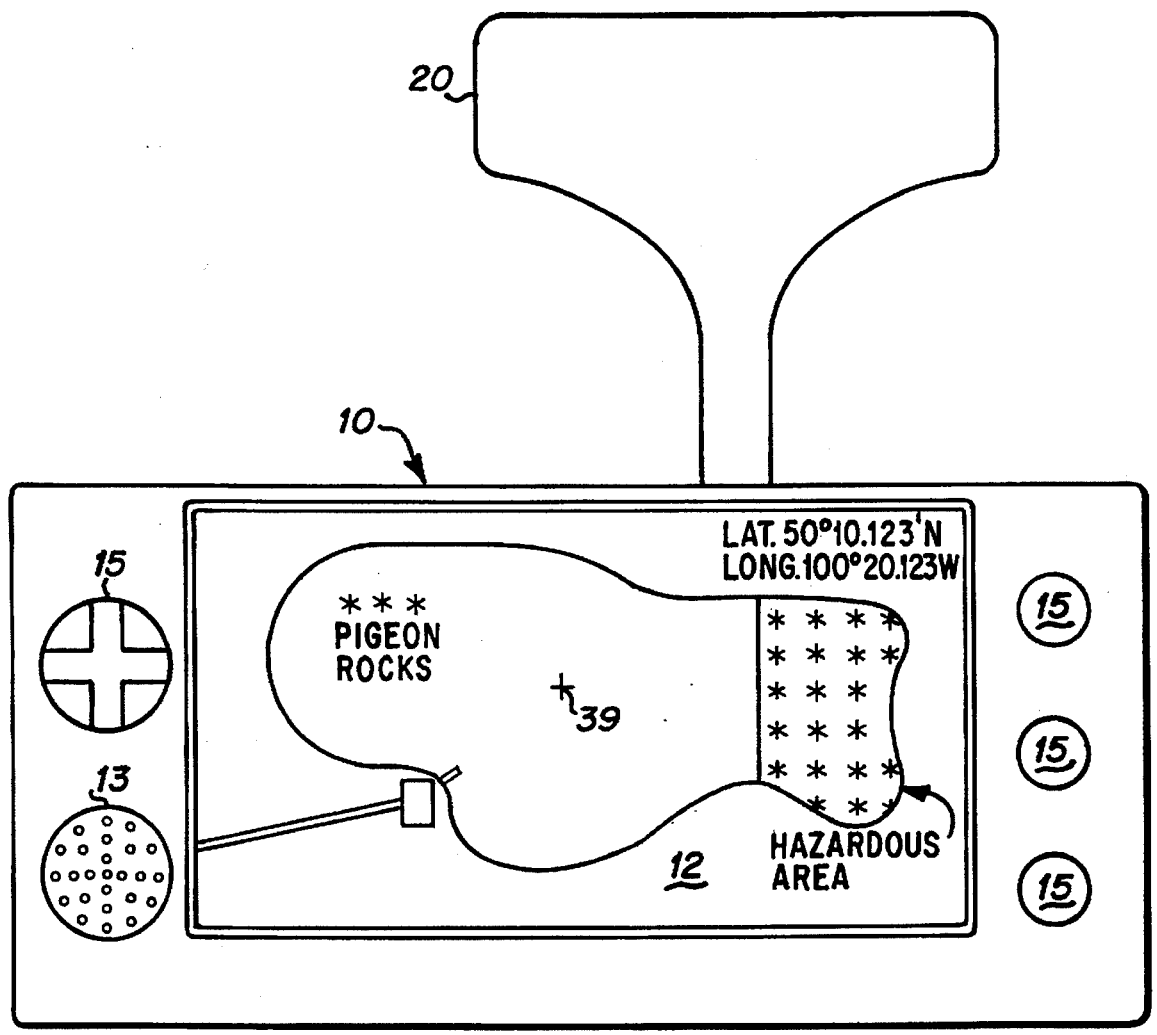
Fig_3

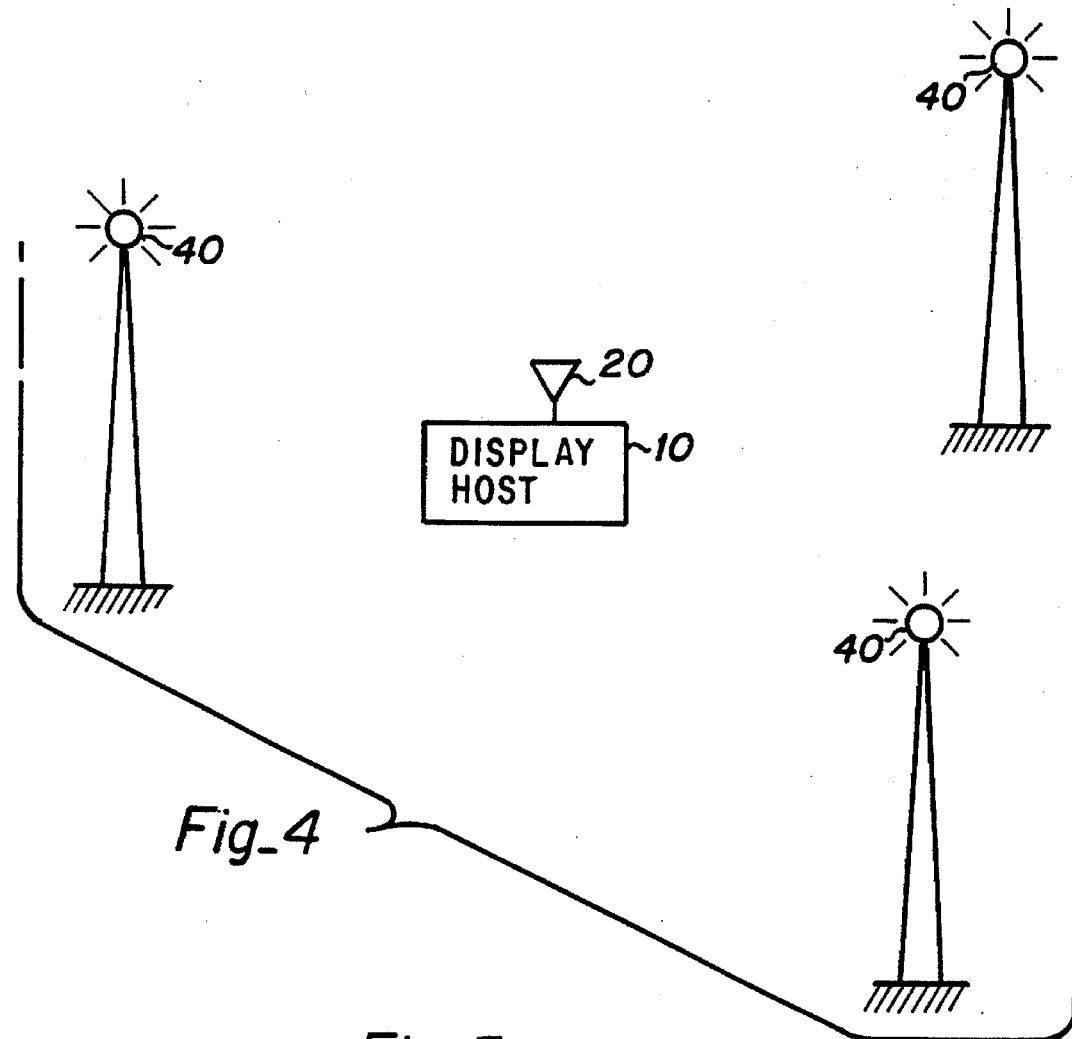
Fig_4
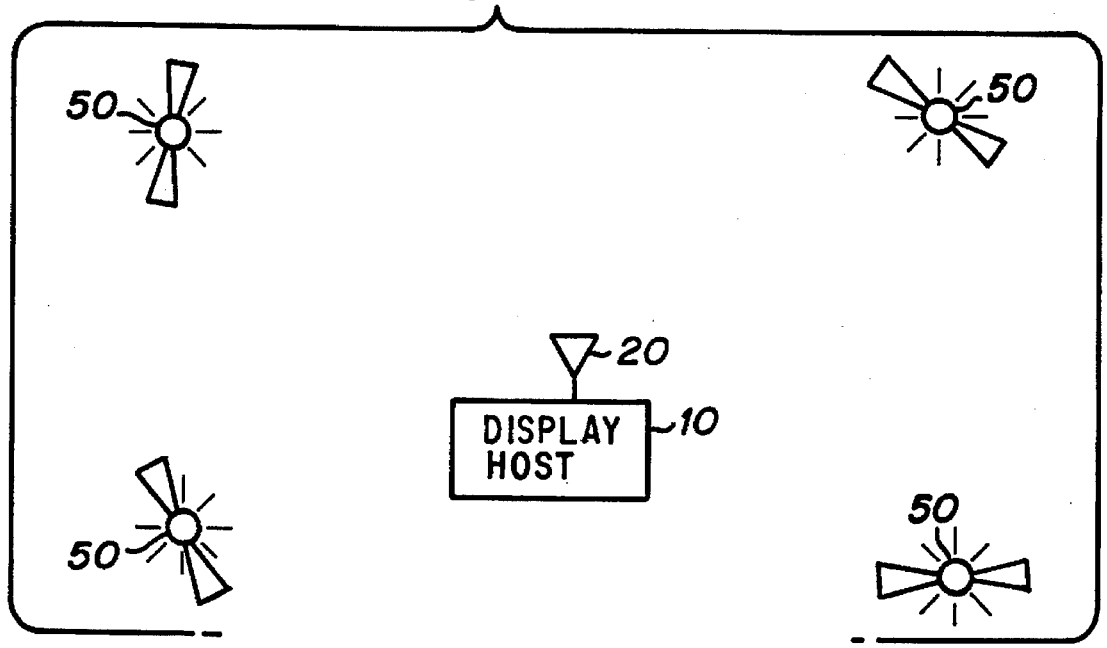
Fig_5

MEMORY CARTRIDGE FOR A HANDHELD ELECTRONIC VIDEO GAME

FIELD OF THE INVENTION

This invention relates to multiple uses of memory cartridges for handheld, electronic video games.

BACKGROUND OF THE INVENTION

Handheld, electronic video game devices are commercially available from many manufacturers. Very high sales volume of these devices and competition among manufacturers, distributors, and retailers has driven prices for these devices to a level that is very low compared to other electronic products of similar complexity where the sales volume and competition are not as great.

The handheld game devices are packaged and sold in two components, a host display and an interchangeable memory cartridge. The memory cartridge connects to the host display to give the appearance of a single, packaged unit with a volume in the range of 250 to 2500 cubic centimeters. Typically, a user purchases one host display and multiple memory cartridges, depending upon how many games he likes and can afford.

Existing host displays have a user interface including keys, a liquid crystal display, and a speaker so that a user can play a game, and have a device interface to a second game device so that two or more users can play a game with or against each other. The memory cartridge includes a memory storage device to store pre-coded software that includes the data and program instructions for the user interface and the game. A processing system in the host display, including a microprocessor, memory, and associated logic hardware, operates electrical data, address, and control lines in a conventional manner to interface the elements in the host display, the memory cartridge, and the second game device.

Hundreds of games are available for recreation, such as games in which the object is to stop space monsters from destroying the earth, and for education, such as games in which the object is to learn multiplication tables. The long term strategy adopted by the manufacturers of the game devices is to sell the host display at a very low price relative to the cost of manufacturing the host display and to make their profit by selling memory cartridges at a higher price relative to the cost of manufacturing the memory cartridge. Since the price of the game device is low to start with, the result of this strategy is that the price of the host display is very low compared to other electronic products.

The manufacturers of the electronic, handheld video game devices and the game software development companies make arrangements to share the profit generated by selling the memory cartridges. To prevent pirate organizations from developing games and manufacturing and/or distributing memory cartridges and not sharing the profit, the game device manufacturers employ a secret security key. Many security key systems have been developed. In the most common system, a character or a set of characters are pre-coded and stored in memory in the host display and a second character or set of characters are pre-coded and stored in the memory storage device in the memory cartridge. When the game is initiated and optionally at times while the user is playing the game, the instructions in the pre-coded software in the memory cartridge and/or in the host display compare the character or characters in the host display and to the character or characters in the memory cartridge to check for a match or other pre-determined relationship. If the characters do not match or relate in the proper manner, the game will terminate. Many workers in the field have described security technology for this purpose. Okada in U.S. Pat. No. 5,134,391 discloses a system in which the processing system in the host display looks for a match between characters stored in the host display and characters stored in the memory cartridge. If a match is found the game can commence, otherwise the game is inhibited.

The device interface in the host display interconnects two or more game devices, where each game device has a memory cartridge, so that two or more users can play a game with or against each other. Existing device interfaces use cabled connections with serial electrical signals. When interconnected, the results shown on the display of one game device depend, in part, upon events in the other game device. For two or more users to play, the software in the memory storage device must be pre-coded with the capability to receive and send information over the device interface.

Printed map and printed yellow page technologies exist entirely separate from game technology. Printed maps are available for almost all features that have geographical locations. Printed yellow pages, which are now available from sources other that the local phone company, are available for information on goods and services that are provided by establishments of many types. A user of maps and/or yellow pages is usually most interested in the information on the features and/or goods and services that are near to his present position, to a planned route, or to a destination. To find the information in which he is most interested, the user must sort through all the information available. A limitation of printed maps and printed yellow pages is that the user must manually sort all the information on the features and/or goods and services in order to find the information that is relevant to his location. A further limitation of printed maps and printed yellow pages is that the user must re-sort all the information on the features and/or goods and services in order to find the information that is relevant to his location each time he travels or is traveling to a new location.

Recently, electronic processing systems and displays have begun to replace paper in some applications. For example, facsimile transmission and files stored in the memory of computer systems have begun to replace post mail and files stored in manila envelopes. Electronic map technology exists to replace paper maps where an electronic map database is stored in memory storage devices as a bit map or raster where data stored sequentially in memory represent the intensity and/or color of sequential pixels of a map or as vectors where data in memory represent the coordinates and intensity and/or color of pixels of a map. The map database may also store characters that are superimposed on the display of the map where characters are in ASCII or a similar format. Multiple color or gray scales require additional data stored in memory for each pixel. Raster maps are easier to develop and less likely to have errors but vector maps can be compressed into less memory and are more easily sorted for features. A combination of raster, vector, and character mapping may be used. Electronic yellow pages technology exists where yellow pages databases including the same or similar goods and services as found in a traditional printed yellow pages in a telephone book are stored in memory storage devices. Yellow pages databases can be stored as a raster, vectors, or characters, or can be stored as a combination of a raster, vectors, and characters. Where the map or yellow pages database is too large for the memory storage device, the database may be divided into a plurality of modules, sometimes overlapping. An electronic display such as a liquid crystal display (LCD), electroluminescent (EL), cathode ray tube (CRT), or other similar electronic technology is used to display the map or yellow pages to the user. A limitation of electronic maps and electronic yellow pages is that the cost of the electronics is substantially greater than the cost of printed paper used for printed maps or printed yellow pages.

Geocoding technology exists to assign location coordinates such as latitude and longitude, latitude, longitude, and altitude, or other coordinate system to an object such as feature on a map or an address in the yellow pages. Geocoding can be used with electronic maps and/or yellow pages so that a user could electronically sort the map and/or yellow pages for information on the features and/or goods and services that are closest to his location. A limitation of geocoded electronic maps and/or yellow pages is that the user must know the coordinates of his present location for the geocoded information to be useful.

Many location determination systems are available or have been proposed to provide location information to a user equipped with a location determination receiver. These receivers include antennas for receiving signals. Ground location determination systems, such as Loran, Omega, TACAN, Decca, U.S. Airforce Joint Tactical Information Distribution System (JTIDS Relnav), or U.S. Army Position Location and Reporting System (PLRS) use the intersection of hyperbolic surfaces to provide location information. A representative ground system is LORAN-C discussed in *LORAN-C User Handbook*, Department of Transportation, U.S. Coast Guard, Commandant Instruction M16562.3, May 1990, which is incorporated by reference herein. LORAN-C provides a typical location accuracy of approximately 400 meters. A limitation of a LORAN-C location determination system is that not all locations in the northern hemisphere and no locations in the southern hemisphere are covered by LORAN-C. A second limitation of LORAN-C is that the typical accuracy of approximately 400 meters is insufficient for many applications. A third limitation of LORAN-C is that weather, local electronic signal interference, poor crossing angles, closely spaced time difference hyperbolas, and skywaves frequently cause the accuracy to be significantly worst than 400 meters.

Other ground location determination devices are based on systems that were developed primarily for communications such as cellular telephone, FM broadcast, and AM broadcast. Some cellular telephone systems provide estimates of location, using comparison of signal strengths from three or more sources. FM broadcast systems having subcarder signals can provide estimates of location by measuring the phase of the signal. FM subcarrier signals are received from three FM radio stations with known locations but unknown relative phases by a mobile location determination receiver and by a fixed station having a known location. The fixed station determines the relative phases of the signal transmitted by the three FM radio stations and transmits these relative phase information to the location determination receiver. The location determination receiver processes this relative phase information together with the relative phases that it measures to compute its location. A limitation of cellular systems and FM subcarder systems for location determination is that they are limited to small regions, with diameters of the order of 20–50 km.

Satellite location determination systems such as Global Positioning System, GPS, and the Global Orbiting Navigational System, GLONASS, use the intersection of spherical surface areas to provide location information with accuracy typically within 100 meters anywhere on or near the surface of the earth. The satellite location determination systems include satellites having signal transmitters to broadcast location information and control stations on earth to track and control the satellites. Location determination receivers process the signals transmitted from the satellites and provide location information to the user.

The Global Positioning System (GPS) is part of a satellite navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, four or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of $8/17$ of a sidereal day (11.26 hours). A GLONASS satellite and a GPS satellite will thus complete 17 and 16 revolutions, respectively, around the Earth every 8 days. The signal frequencies of both GPS and GLONASS are in L-band (1 to 2 GHz).

Since the signals from the satellites pass through the tropospheric for only a short distance, the accuracy of satellite location determination systems such as GPS or GLONASS is largely unaffected by weather or local anomalies. Due to the high frequencies used and the attenuation caused by the great distance over which the signals must travel, a limitation of satellite determination systems is that the location determination receiver must be in line of sight to the satellites in order to receive the satellite signals. A further limitation of GLONASS is that it is not clear that the Russian Republic has the resources to complete and to maintain the system for full world wide 24 hour coverage.

GPS is used by many professionals engaged in navigation and surveying fields such as marine navigation, aircraft piloting, seismology, boundary surveying, and other applications where accurate location is required or where the cost of GPS is small compared to the cost of a mistake in determining location. Some professionals engaged in mobile fields such as utilities, insurance, ranching, prospecting, ambulance driving, trucking, delivery, police, fire, real estate, forestry, and other mobile applications use GPS to save time in their work. GPS is also used for personal travel such as hiking, biking, horseback riding, yachting, fishing, driving in personal cars, and other travel activities. However, most mobile professional and personal users of GPS find that location coordinates as provided by GPS are of limited use unless the map features and/or yellow pages addresses they are using are also located in the same coordinate system. GPS products exist that combine a GPS location determination receiver, an electronic map and/or electronic yellow pages, and geocoding in order to relate the users location to geographical features and/or addresses of goods and services but these products are not mobile and are expensive. Since the market size for navigation and surveying professionals is not large, GPS products have not achieved the manufacturing and distribution volume required to drive costs of the products low enough to attract the majority of mobile professionals and personal travelers.

What is needed is a handhold apparatus that provides a mobile professional or personal traveler user the locations of map features and/or yellow page establishments that are nearby or proximate to his own location. In order to find acceptance in the mobile professional and personal markets, the apparatus must be affordable.

SUMMARY OF THE INVENTION

A first principal object of the invention is to provide an apparatus that includes a memory cartridge, a host display, and a location determination receiver. The memory cartridge includes an electronic memory storage device. Pre-coded software stored in the memory storage device includes user interface software, software to interface to the location determination receiver, and application software. The host display has either a visual display, a speaker, or both, one or more keys, an interconnection to the memory cartridge, and an interconnection to the location determination device. A processor system in the host display operates in a conventional manner to receive key entries from a user, to receive location information from the location determination receiver, to read the pre-coded software in the memory storage device, and to output to the user through the visual display, the speaker, or both. The host display, the memory storage device, and the location determination receiver may include a security key if required by the manufacturer or of the location determination receiver to prevent unauthorized host displays, memory cartridges, or location determination receivers from operating together.

A second principal object of the invention is to provide application software for an electronic map with geocoding so that features of the map that are proximate to the location computed by the location determination receiver may be displayed on the visual display and/or speaker.

A third principal object of the invention is to provide application software for an electronic yellow pages with geocoding so that addresses of the yellow pages that are proximate to the location computed by the location determination receiver may be displayed on the visual display and/or speaker.

A fourth principal object is to provide a location determination receiver using a ground location determination system such as LORAN-C, Omega, TACAN, Decca, JTIDS Relnav, PLRS, cellular telephone, FM subcarder, or AM broadcast.

A fifth principal object is to provide a location determination receiver using a satellite location determination system such as GPS or GLONASS.

Due to high manufacturing volume and competition among vendors, the cost of a handheld, electronic video game device is very low compared to other products of similar complexity and is expected to continue to decrease. By coupling a location determination receiver and application software for a geocoded map and/or geocoded yellow pages to a handheld, electronic video game device, the apparatus provides location and proximate map features and/or yellow pages addresses at a cost that a greater number of mobile professionals and personal travelers can afford. Further, the large installed base of handheld, electronic video game devices already sold means that many users will pay only the incremental cost of adding location determination receiver and application software but not pay the cost of another host display.

BRIEF DESCRIPTION OF THE FIGURES

FIG. 3 illustrates the appearance of the invention having an electronic map.

FIG. 4 illustrates a ground location determination system according to the invention.

FIG. 5 illustrates a satellite location determination system according to the invention.

DETAILED DESCRIPTION OF THE INVENTION

Figure 1:
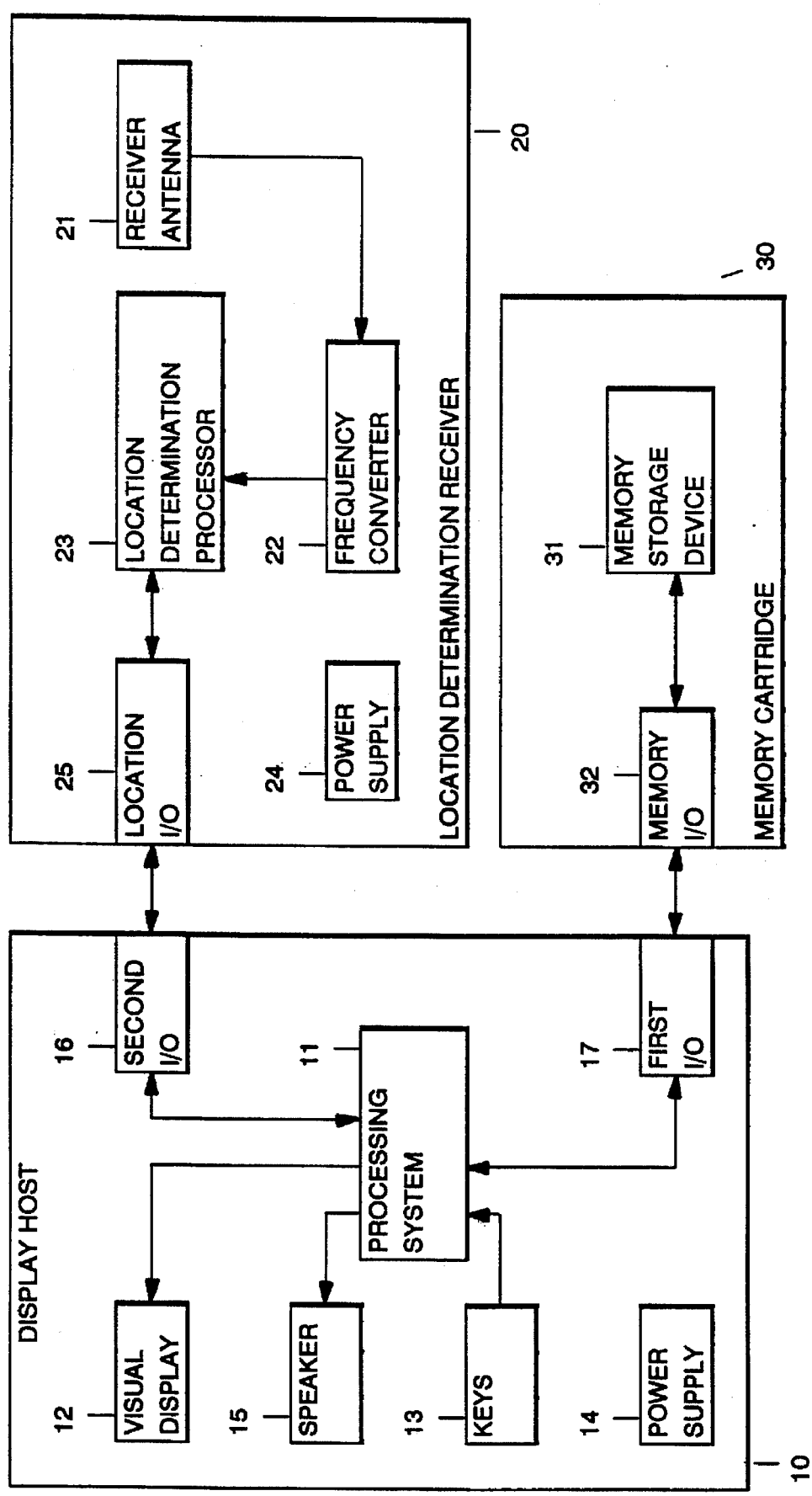
FIG. 1 illustrates the block diagram according to the invention.

FIG. 1 illustrates the block diagram of the invention including a host display 10, a memory cartridge 30, and a location determination receiver 20. The memory cartridge 30 includes a memory storage device 31. The memory storage device 31 may be a masked Read Only Memory (ROM), One Time Programmable (OTP) Read Only Memory, Programmable Read Only Memory (PROM), Electronically Programmable Read Only Memory (EPROM), Electronically Erasable Programmable Read Only Memory (EEPROM), Flash memory, Random Access Memory (RAM), or any other similar component. A memory I/O 32 electrically connects the memory storage device 31 to a processing system 11 in the host display 10 and mechanically connects the memory cartridge 30 to a host display 10. The memory I/O 32 may be as simple as traces on a printed circuit board where the traces form pin connections.

The host display 10 includes the processing system 11 including a microprocessor, memory, and associated hardware, that operates with pre-coded program instructions in a conventional manner to receive digital signals, process information, and issue digital signals. A user interface in the host display 10 includes either a visual display 12 to visually display signals received from the processing system 11 to the user, or a speaker 15 to audibly display signals received from the processing system 11 to the user, or both the visual display 12 and the speaker 15. Keys 13 issue signals to the processing system 11 from the user. The keys 13 may include one or more push keys, toggle switches, proximity switches, magnetic or optical balls, soft keys on the visual display 12, microphones or a combination of any of the above used together or with other similar type user input methods. The host display 10 also includes a first I/O 17 to electrically connect the processing system 11 to the memory storage device 31 and mechanically connect the host display 10 to the memory cartridge 30. The first I/O 17 may be as simple as spring sockets to receive traces on a printed circuit board. A second I/O 16 electrically connects the processing system 11 and mechanically connects the host display 10 to a location determination device 20. The memory I/O 32 and the first I/O 17 may include a cable that carries serial electrical signals, a wireless link carrying serial electrical signals, a cable that carries a parallel electrical signals, or a direct mechanical connection that may carry either serial or parallel electrical signals, each operating in a conventional manner for interfacing electrical products. A power supply 14 in the host display 10 supplies power to at least one of the elements of the host display 10, the memory cartridge 30, or the location determination receiver 20.

Figure 2:
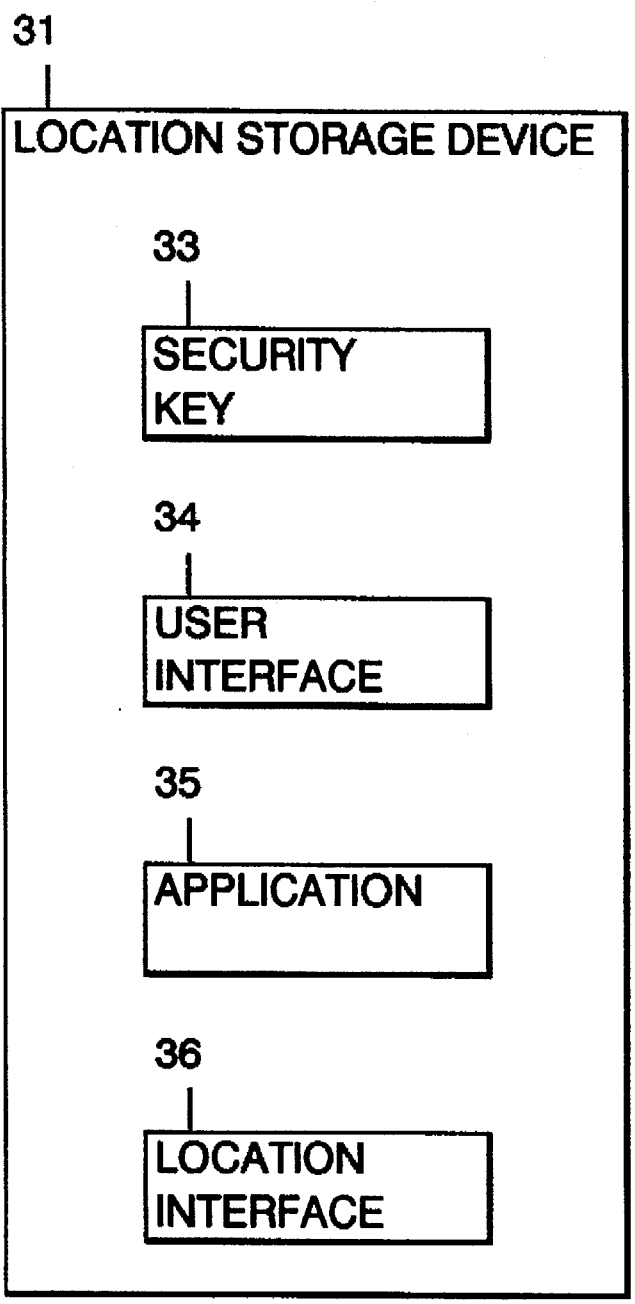
FIG. 2 illustrates the major pre-coded software blocks in the memory cartridge.

FIG. 2 illustrates pre-coded data and program instruction software stored in the memory storage device 31 for a user interface 34, for a location interface 36, for a pre-coded application 35, and for an optional security key 33 to prevent an unauthorized host display 10, memory cartridge 30, and/or location determination receiver 20 from being used together. To display his location, the user enters a command through the keys 13, the processing system 11 processes the command with the pre-coded software in the user interface 34 and the pre-coded software location interface 36 to get the location. If an application is installed, the pre-coded software in the user interface 34 will apply the pre-coded software application 35 to the location information and issue a result which the processing system 11 will issue to either the visual display 12, or speaker 15, or both.

FIG. 3 illustrates the appearance of the invention where the pre-coded application software includes an electronic map. The front panel of the host display 10 shows the visual display 12, the speaker 13, and keys 15. The location determination receiver 20 is also shown. Icon 39 shows a visual display of the users location in relation to the map. The map shown in the visual display 12 is a topographic map showing a lake and the shore land in the vicinity of the lake. The lake has three rocks called "Pigeon Rocks," a hazardous area having many rocks, and a dock projecting into the lake. Characters for "Pigeon Rocks" and "Hazardous Area" are superimposed on the map. The shore land has a road and a building. The user's position in the lake is shown by the icon 39. The characters representing the user's position in latitude and longitude is shown superimposed on the upper right corner of the map display. As the user's position changes the icon 39 moves on the map and the latitude and longitude changes. In a typical use, when the icon 39 moves outside a center region of the map the map pans to bring the icon 39 back to the center region. Included within the map is at least one of the following: topography such as elevation, land, and water; transportation ways such as roads, marine charts, aviation charts, walking paths, and offroad trails; utilities such as electricity, water, and gas; land boundaries such as private property ownership, jurisdictions of government organizations, and building code zoning; natural features such as animal life, vegetation, mineral deposits, and soil types; safety such as fire hazard zones and hazardous waste sites; and other similar types. The keys 13 allow the user to use software in the pre-coded application 35 to zoom in and out and to pan the map. Zooming in increases the scale so that the map is viewed with greater resolution over a lesser area of the map. Zooming out decreases the scale so that a greater area of the map is viewed with lesser resolution. Panning is moving the map left, right, up, or down to change the portion of the map that is displayed. The pre-coded application software stored in the memory storage device 31 under the control of the user and the processing system 11 uses the visual display 12 or the speaker 15 to tell the user the range, bearing, estimated time of arrival, hazardous situation, and/or other navigational facts relating the user's location computed by the location determination receiver to a pre-determined location entered by the user through the keys 13.

In a second variation of the invention, the pre-coded application software includes an electronic yellow pages (not illustrated). Included within the yellow pages are at least one of the following: restaurants, food take-out places, bars, grocery stores, liquor stores, hotels, motels, marine repair facilities, aviation repair facilities, automotive repair facilities, service stations, auto parts stores, pharmacies, drug stores, hardware stores, hospitals, emergency care clinics, doctors, dentists, veterinarians, emergency care for animals, lawyers, highway patrol stations, police stations, coast guard stations, clean up services for hazardous wastes, or other subjects typically found in a traditional printed yellow pages. Information on the establishments includes location of the establishment and at least one of subject, name, as address, telephone and/or facsimile number, days open, hours open, specialties, size, and/or similar parameter such as is found in a traditional telephone yellow pages. The software in the pre-coded application 35 sorts the establishments in the electronic yellow pages by location and at least one other of the optionally selected parameters of the establishment and displays on command information on the establishments fit the selected parameters and are closest to the user's location.

FIG. 4 illustrates a ground location determination system using LORAN-C. A LORAN-C location determination receiver 20 receivers signals transmitted from at least three (3) LORAN-C ground signal transmitters 40 in the same chain including a transmitter to transmit a master signal and at least two transmitters that each transmit a slave signal. The master and slave signals are time synchronized with each slave signal transmitted with a pre-determined time delay as compared to the master signal. The transmitted signals are bursts of ten (10) or eleven (11) cycles of a 100 KHz carrier where the bursts are spaced by pre-determined time intervals that are unique to each chain. The LORAN-C location determination receiver 20 measures a time difference between each of the slave signals and the master signal by comparing the time of the zero crossing of the third (3rd) cycle of the signal. The pre-determined time delays of the slave signals combined with the measured time differences between the master and slave signals form hyperbolic lines on the surface of the earth with loci at the slave signal transmitters sites. Location is computed from the intersection of two hyperbolic lines. Where two intersections are found, the intersection that results in a realistic rate of change of the intersection over time, the user's velocity, is chosen. The host display 10 displays the location computed in the location determination receiver 20.

FIG. 5 illustrates a satellite location determination system using Global Positioning System, GPS, or Global Orbiting Navigation Satellite System, GLONASS, satellite signal transmitters 50. Each GPS satellite signal transmitter 50 transmits two spread spectrum, L-band carrier signals: an L1 signal having a frequency $f1=1575.42$ MHz and an L2 signal having a frequency $f2=1227.6$ MHz. These two frequencies are integral multiples $f1=1540\ f0$ and $f2=1200\ f0$ of a base frequency $f0=1.023$ MHz. The L1 s signal from each satellite signal transmitter 59 is binary phase shift key (BPSK) modulated by two pseudo-random noise (PRN) codes in phase quadrature, designated as the C/A-code and P-code. The L2 signal from each satellite signal transmitter 50 is BPSK modulated by only the C/A-code. The nature of these PRN codes is described below. Location information is o transmitted at a rate of 50 baud.

The GLONASS system uses two earlier signals L1 and L2 with frequencies of $f1=(1.602+9k/16)$ GHz and $f2=(1.246+7k/16)$ GHz, where k $(=0, 1, 2, \ldots, 23)$ is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellite signal transmitters 50 also transmit location information at rate of 50 Baud. Because the channel frequencies are distinguishable from each other, the P-code is the same, and the C/A-code is the same, for each satellite signal transmitter 50. The methods for receiving and analyzing the GLONASS signals are similar to the methods used for the GPS signals. One motivation for use of two carrier signals L1 and L2 is to allow partial compensation for propagation delay of such a signal through the ionosphere, which delay varies approximately as the inverse square of signal frequency f. When transit time delay through the ionosphere is determined, a phase delay associated with a given carrier signal can be determined.

Use of the PRN codes allows use of a plurality of GPS satellite signal transmitters for determining an observer's position and for providing location information. A signal transmitted by a particular GPS satellite is selected by generating and matching, or correlating, the PRN code for that particular satellite signal transmitter 50. All PRN codes are known and are generated or stored in GPS location determination receiver 20. A first PRN code for each GPS satellite signal transmitter 50, sometimes referred to as a precision code or P-code, is a relatively long, fine-grained code having an associated clock or chip rate of 10 f0=10.23 MHz. A second PRN code for each GPS satellite signal transmitter 50, sometimes referred to as a clear/acquisition code or C/A-code, is intended to facilitate rapid signal acquisition and hand-over to the P-code and is a relatively short, coarser-grained code having a clock or chip rate of f0=1.023 MHz. The C/A-code for any GPS satellite signal transmitter 50 has a length of 1023 chips or time increments before this code repeats. The full P-code has a length of 259 days, with each satellite signal transmitter 50 transmitting a unique portion of the full P-code. The portion of P-code used for a given GPS satellite signal transmitter 50 has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision A, Sep. 26, 1984, which is incorporated by reference herein.

The GPS satellite signal transmitter 50 bit stream includes location information on the ephemeris of the transmitting GPS satellite and an almanac for all GPS satellites, with parameters providing corrections for ionospheric signal propagation delays suitable for single frequency receivers and for an offset time between satellite signal transmitter 50 clock time and true GPS time.

Referring again to FIG. 1, the host display 10 displays the location computed in the location determination receiver 20. The location determination receiver 20 includes a receiver antenna 21 to receive signals transmitted by the ground signal transmitters 40 or satellite signal transmitters 50, a frequency converter 22 to convert the frequency of the signals to a frequency that is suitable for processing, a location determination processor 23 to demodulate and process the signal and to provide location information, and a location I/O 25 to receive request signals from and transmit location information to the host display 10. If the location determination receiver 20 is a LORAN-C the frequency converter 22 is not required. The elements in the location determination receiver 20 may optionally receive power from a power supply 24 or from the host display 10. The location I/O 25 and the second I/O 16 may include a cable that carries serial electrical signals, a wireless link that carries serial electrical signals, a cable that carries a parallel electrical signals, or a direct mechanical link with no cable that may carry either serial or parallel electrical signals, each of which operate in a conventional manner for interfacing electrical products.

We claim:

1. A handheld game playing apparatus which receives removable game cartridges and operates only with removable game cartridges having predetermined security keys comprising:

a display;

a global positioning satellite receiver;

a removable game cartridge having a predetermined security key and operating instructions;

a game port for receiving the removable game cartridge;

a port for receiving information from the global positioning satellite receiver; and a processing system including:

(1) means for controlling the display;

(2) means for operating in accordance with the operating instructions from the removable game cartridge, the operating instructions including instructions for receiving information from the global positioning satellite receiver and displaying a representation of a location on the display based on the information; and (3) means for verifying the predetermined security key and for activating the means for operating only if the predetermined security key has been verified.

2. The handheld game playing apparatus of claim 1, wherein:

the removable game cartridge further comprises a database of predetermined location information; and the processing system further comprises means for displaying representations of the predetermined locations on the displays when the predetermined locations are proximate the location based on the global positioning satellite information.

3. The handheld game playing apparatus of claim 1, wherein:

the removable game cartridge further comprises a database of predetermined map feature information; and the processing system further comprises means for displaying map features on the display when the map features are proximate the location based on the global positioning satellite information.

* * * * *